Patented May 13, 1947

2,420,381

UNITED STATES PATENT OFFICE 2,420,381

PLASTICIZED ZEIN COMPOSITION

Latimer D. Myers, Cincinnati, Ohio, assignor to Emery Industries, Inc., Cincinnati, Ohio, a corporation of Ohio No Drawing. Application February 23, 1943, Serial No. 476,846

5 Claims. (Cl. 106—153)

This invention relates to plasticizers for zein.

Zein is an alcohol soluble protein derived from corn germ. As produced commercially, it is a light yellow, fluffy powder which has the property of forming tough resins when it is admixed with formaldehyde and cured under heat and pressure. These materials are useful for a variety of purposes. They may be molded into solid objects having high tensile strength. Sheets of a tough, somewhat rubber-like substance may be produced which find usage in producing gaskets and seals. Zein also may be used for coating and impregnating cloth and paper.

While zein is somewhat similar to resins formed from casein the formaldehyde does not act upon zein immediately which enables the products to be handled with somewhat less care than casein resins. Moreover, zein has much greater water resistance and higher tensile strength.

In producing these materials plasticizers are desirable both for the purpose of imparting soft or elastic properties to the final products and for the purpose of enabling the admixtures of formaldehyde and zein to be worked more readily. It is obvious, however, that any plasticizer which impairs the water resistance of the cured products, their tensile strength or other unique qualities, is undesirable, and at the present time it is generally recognized that no truly satisfactory plasticizer for zein is known or available. Dibutyl tartrate, fatty acids of high molecular weight, glycol phthalate, esters of hydroxy acids, diethylene glycol and its polymers and other substances have been proposed during the extensive investigations which have been carried on in order that zein might enjoy the full commercial usage which its other properties suggest. However, all of these plasticizers are deficient in one way or another. Some decrease water resistance; others are incompatible, and still others tend to bleed from the zein after curing. The primary purpose of the present invention has been to provide plasticizers which do not display these undesirable characteristics.

The invention is based upon the discovery and determination that half esters of monohydric alcohols and dicarboxylic acid readily accomplish the desired result. For instance, a typical zein plasticizer of the present invention is the half methyl ester of azelaic acid.

Zein is principally used three ways:

1. From an alcoholic solution for coating paper, etc. In this case the zein is usually used uncured, first, because in paper processing the temperatures employed are not high enough to permit of reaction of the zein and formaldehyde; second, because zein alcohol and formaldehyde mixtures become very viscous and difficult to handle.

2. As a hot mix to form coatings for adhesives for seams, etc. For this purpose the zein and plasticizer should form a sufficiently fluid mass at an elevated temperature to permit application, but should have sufficiently good "body" to provide physical strength at ordinary temperatures. Formaldehyde or preferably solid paraformaldehyde could be used provided the temperature of application is not so high as to initiate reaction with the formaldehyde. If tackiness is desired the uncured zein may be preferred.

3. Use as a moulding compound. For this use zein and plasticizer are mixed together either on a mill or in a Banbury together with fillers, preferably neutral fillers such as iron oxide or carbon black. And finally paraformaldehyde 1½ to 2% added. The temperature at this point should not be too high or the time of mixing while hot too long or a complete cure will result. A partial cure is desirable as the mixture loses its tackiness and leaves the Banbury or rolls clean.

Blanks can then be prepared and the complete cure and shaping of the finished article secured by heat and pressure in a mold.

The amount of plasticizer used in accordance with the present invention may vary anywhere between 5 and 50%, more or less, the exact quantities, of course, being related to the degree of softness or plasticity desired and also upon curing time and temperature. Fillers and pigments such as iron oxide and carbon black may be used in conjunction with the plasticizers as desired and it is also to be noted that the plasticizers of the present invention also may be used in conjunction with conventional plasticizers when special properties are to be obtained.

In producing the plasticizers of the present invention approximately one-half the quantity of monohydric alcohol required for esterification of the dicarboxylic acid is admixed with the dicarboxylic acid and the two are caused to react together to produce the half ester. A catalyst such as sodium acid sulphate is useful in promoting the reaction. While methyl alcohol is the preferred monohydric alcohol, others such as ethyl, butyl, propyl and isopropyl and the like containing from 1 to 12 carbon atoms may be employed to like advantage. Azelaic acid, having nine carbon atoms, is preferred for esterification. However, other low molecular weight dibasic acids, including phthalic, adipic and sebacic, in general those containing from 4 to 18 carbon atoms in chain length, may be used.

While the plasticizers disclosed herein have been termed half esters, the fact is recognized that direct esterification of the monohydric alcohol and dicarboxylic acid may lead to the production of some di-ester and that some unreacted dicarboxylic acid may be present in the final product. However, in any event, the true half ester constitutes a major portion of the product of reaction and any di-esters or free dicarboxylic acid which may be present do not in any manner interfere with the plasticizing action of this major constituent.

Direct esterification is disclosed in the specification as the process most suitable for production of the plasticizers because of the convenience and simplicity of the process. However, half esters produced by other processes, as will be understood by those skilled in the art, are intended to be included in this invention. For instance, in an alternative process azelaic acid may be reacted with an excess of alcohol to form the di-ester and the di-ester saponified with a quantity of alkali sufficient to saponify only one alcohol group and the half ester recovered by acidulation.

Typical examples of the direct esterification process are as follows:

Preparation of the methyl half ester of azelaic acid

Reflux 846 parts of azelaic acid and 145 parts of 99% methanol and 9 parts of sodium acid sulfate as a catalyst for three hours or until a free acid content of 46.5% expressed as azelaic acid is attained.

Stirring during the reaction is advantageous to prevent fusion of the catalyst on the bottom of the reaction vessel.

If through accidental loss of alcohol through the condenser the desired free acid content is not attained an additional amount of alcohol may be added and refluxing continued.

The reaction mix is then heated without the reflux to 120° C. to remove the moisture formed during the reaction. The catalyst settles and the half methyl ester of azelaic acid can be drawn off or the catalyst removed by filtration.

Preparation of octyl half ester of maleic acid

Heated together 98 parts of maleic anhydride and 130 parts of octyl alcohol at 120° C. until a clear homogeneous liquid resulted (about 15 minutes). Heating was stopped at this point and the product allowed to cool. The finished product was a clear viscous liquid having an FFA of 25.1% as maleic acid (theoretical 25.4%) and was found to be a good plasticizer for zein.

Preparation of methyl half ester of phthalic acid 148 parts of phthalic anhydride, 32 parts of 99% methyl alcohol, and 5 parts of sodium acid sulfate were refluxed for 2 hours after which time the acid value had reached 39.6% as phthalic anhydride. The product was filtered to remove sodium acid sulfate.

Preparation of butyl half ester by saponification

Dissolved 56 gms. KOH in 200 gms. 95% ethyl alcohol and added to 300 gms. of dibutyl azelate slowly with stirring. The mixture was a heavy gel similar in appearance to a starch gel. The gel was thinned with about 3 times its volume of petroleum ether and filtered with the aid of diatomaceous filter aid.

The filtrate was heated to remove petroleum ether and then dissolved in water and acidulated with HCl. The oily layer which separated was washed with water and then heated until the odor of butyl alcohol has disappeared. Obtained 125 gms. of an oily material having an FFA of 33% as azelaic acid. (theoretical FFA of butyl half ester 38.5%). This material is a good plasticizer for zein.

Zein plasticizer from oxidation product of unsaturated fatty acid

For this purpose the mixture of oxidation products obtained by oxidizing oleic acid and containing low molecular weight monobasic acids, dicarboxylic acids and unchanged fatty acids may be used as obtained or may be partially distilled to remove the low molecular weight acids possessing the greatest odor. In case distillation is carried out from 10 to 15% of the mixed oxidation product is distilled over leaving the residue with a fairly bland odor.

Using the topped material 300 parts having an acid number of 454 are refluxed with 25.5 parts of 99% methyl alcohol and 4.5 parts of sodium acid sulfate in a suitable reaction vessel. After 2 hours the acid number had dropped to 297, corresponding to the esterification of ½ of the carboxy groups of the dicarboxylic acids present.

The product was filtered to remove sodium acid sulfate and heated to 220° F. to remove water of reaction. If desired the product may be bleached by using .5% of hydrogen peroxide.

All of the products of the above examples when warmed with zein in the ratio of 50 parts plasticizer to 50 parts zein form clear homogeneous mixes, the fluidity of which may vary somewhat depending upon the efficiency of the plasticizer. As a rather general rule it appears to be desirable to use a lower molecular weight alcohol with a high molecular weight acid and vice versa. In this manner the esters are sufficiently high in molecular weight to be relatively non volatile but are low enough in molecular weight to retain compatibility. This statement is intended only as a general guide and this application is in no way limited by it.

A still further variation on all of the above consists of neutralizing the carboxy group of a half ester by means of an organic neutralizing agent preferably an ethanol amine. For example, the ethanol amine soaps of half esters are plasticizers. The sodium soaps are too water soluble and not compatible.

The triethanol amine soaps are desirable where a neutral product is desired as in coating wrapping papers or the like.

Having described my invention, I claim:

1. A zein composition comprising plasticized zein containing a half ester of a dicarboxylic acid having 4 to 18 carbon atoms and a monohydric alcohol having 1 to 12 carbon atoms as the principal plasticizing agent.

2. A zein composition comprising plasticized zein containing from approximately 5 to 50% by weight of a plasticizer consisting of the half methyl ester of azelaic acid.

3. Cured zein containing as one of its main plasticizing agents the half ester of a dicarboxylic acid having 4 to 18 carbon atoms and a monohydric alcohol having 1 to 12 carbon atoms.

4. A zein composition comprising plasticized zein in which the principal plasticizing agent is a half ester of adipic acid and a monohydric alcohol having 1 to 12 carbon atoms.

5. A zein composition comprising plasticized zein in which the principal plasticizing agent is a half ester of sebacic acid and a monohydric alcohol having 1 to 12 carbon atoms.

LATIMER D. MYERS.

REFERENCES CITED

The following references are of record in the file of this patent:

UNITED STATES PATENTS

| Number | Name | Date |
|---|---|---|
| 2,285,758 | Sturken | June 9, 1942 |
| 2,115,716 | Hansen | May 3, 1938 |
| 2,005,414 | Dykstra | June 18, 1935 |
| 1,972,092 | Graves et al. | Sept. 4, 1934 |
| 1,939,676 | Ensminger | Dec. 19, 1933 |
| 2,185,110 | Coleman | Dec. 26, 1939 |
| 1,316,854 | Ostenberg | Sept. 23, 1919 |

FOREIGN PATENTS

| Number | Country | Date |
|---|---|---|
| 22,662 | Great Britain | 1901 |

OTHER REFERENCES

Chemical Abstracts, vol. 26, page 5970, 1932, Abstract of German Patent 554,700 to Naegelli et al.